UNITED STATES PATENT OFFICE.

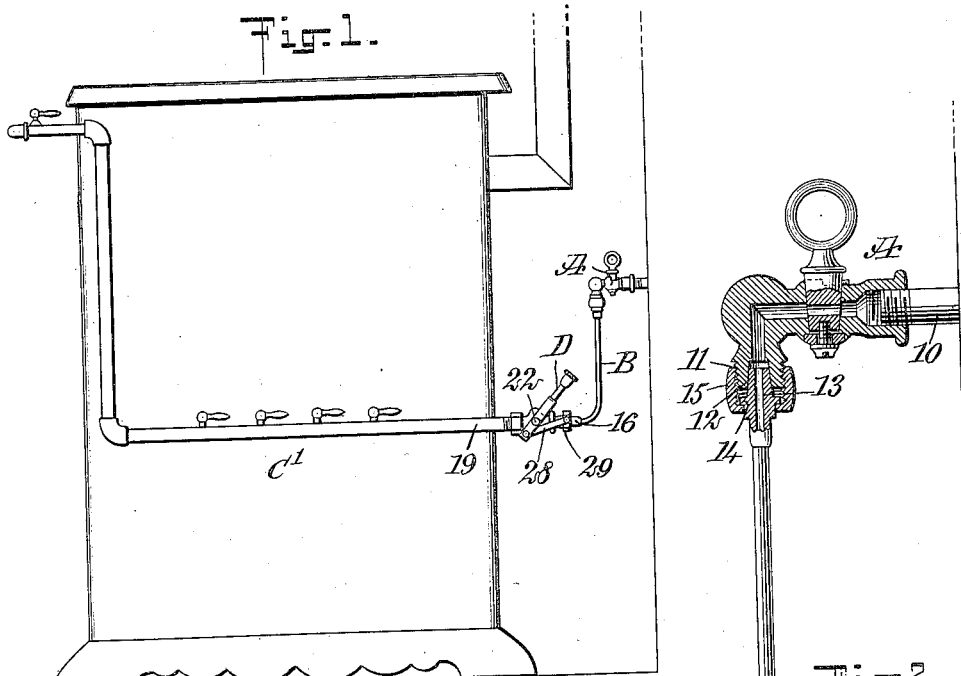
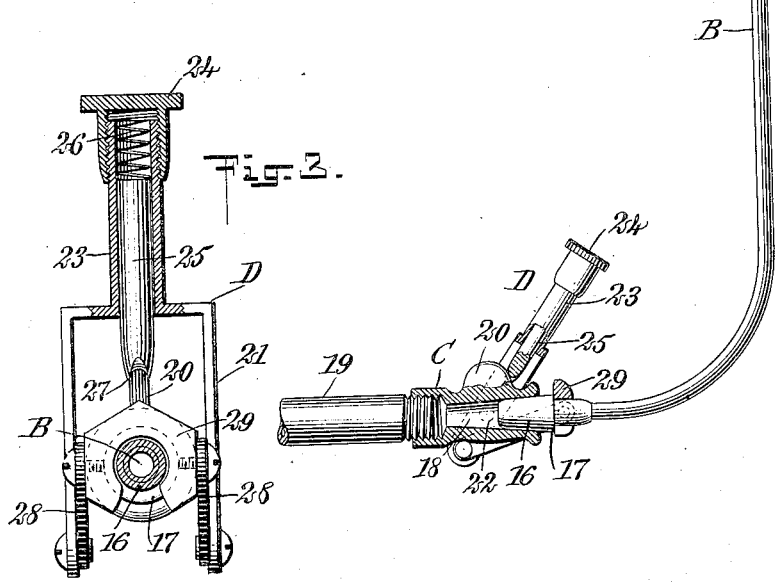

HERMAN E. LOEBE, OF JERSEY CITY, NEW JERSEY.

PIPE AND GAS CONNECTION.

No. 877,849.

Specification of Letters Patent.

Patented Jan. 28, 1908.

Application filed May 21, 1907. Serial No. 374,907.

*To all whom it may concern:*

Be it known that I, HERMAN E. LOEBE, a citizen of the United States, and a resident of Jersey City, in the county of Hudson and State of New Jersey, have invented a new and useful Improvement in Pipe and Gas Connections, of which the following is a full, clear, and exact description.

The purpose of the invention is to provide a connection between a gas supply pipe and a gas stove or the like, capable of being quickly and conveniently made and in a thoroughly gas-tight manner, without the employment of the customary flexible rubber tube, and also to provide a coupling that can be as readily and conveniently disconnected as applied.

It is a further purpose of the invention to provide a coupling or connection of the character described, that will be rigid and non-leakable at either end, and which in its construction will be simple, durable, economic and capable of ready manipulation.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of the coupling, illustrating its application to a gas range; Fig. 2 is a sectional side elevation of the coupling, drawn upon an enlarged scale; and Fig. 3 is a section through the lower portion of the connection or coupling, illustrating the operating lever of that part in vertical position.

A represents a gas cock that is secured to the gas supply or service pipe 10, and the said cock A is provided at its outlet end with the customary thread 11, and likewise with an interior conical chamber 12. The connecting pipe B employed is of metal, and is provided at its inlet end with a conical head 13, that is made to fit snugly in the conical chamber 12 of the gas cock A, and the said head 13 is provided with an annular flange 14 whereby to hold in position thereon a nut 15, which nut is adapted to be screwed upon the exteriorly threaded portion 11 of the gas cock, so as to draw the head 13 in the chamber of the latter and make a thoroughly gas-tight connection.

At the lower end of the connecting pipe B, which pipe may be given any desired shape, an outlet head 16 is provided and this outlet head 16 is also conical or of tapering shape, but its rear portion is reduced in diameter so as to provide an annular shoulder 17. This outlet head 16 is adapted to enter a correspondingly tapered chamber 18 in a fitting C, which fitting is screwed to or is otherwise connected with the supply pipe 19 of a gas range C', a gas stove or the like. The said fitting C is provided at its upper central portion with a segmental lug 20, and the fitting C is further provided with an operating lever D, the lower portion 21 whereof is bifurcated so as to straddle the fitting C, and the upper portion 23 of the said lever is tubular and its upper end is covered by a cap 24. A detent 25 is located within the upper tubular section of the said lever D, and this detent is pressed downward by a spring 26, engaging with the upper end of the detent, the spring being located within the tubular section of the lever D just below its cap 24.

The side members of the bifurcated section 21 of the operating lever D extend down below the fitting C, and the said members are pivotally connected with the said fitting by screws 22 or their equivalents. The detent 25 is provided at its lower end with a groove 27, so that the said detent can straddle and yet engage with the lug 20, as is shown in Fig. 3, in which figure the lever D is in a vertical position. Links 28 are pivoted to the lower ends of the side members of the lower section of the said lever D, and the said links are also pivoted to a slotted collar 29, which collar is adapted to slide upon the outlet head 16 of the connecting pipe B, and when the said head 16 is forced into the fitting C the said collar engages with the shoulder 17 on the head 16, as is shown in Fig. 2, firmly holding the head 16 in the said fitting and in such manner that there can be no possibility of leakage. The detent 25 carried by the lever D acts to prevent the said lever from being accidentally moved from its set position.

In the operation of the device, the pipe B having been connected in the manner described with the source of gas supply, the outlet head 16 is entered into the chamber 18 of the fitting C, the lever D being then carried in direction of the outlet end of the said fitting, so as to leave the collar 29 free to be moved up or down from the head 16 of the connecting pipe B. The collar 29 is then brought to a lower position straddling the pipe B, and the lever D is carried to the outer position shown in Figs. 1 and 2, thus drawing the collar 29 firmly against the shoulder 17 of the entering head 16, forcing the said head into close engagement with the wall of the chamber 18 in the fitting and holding it in such position. Thus it will be observed that a connection between the source of gas supply and a stove, for example, can be quickly made by one movement of the lever D, and the disconnection can be as quickly accomplished by a single movement of the lever D in an opposite direction.

I desire it to be understood that while I have described the device as especially adapted for use in making gas connections, it can be used with equally good results in making water connections; in fact, the device is practically a coupling for making pipe connections. It is also evident that by screwing down the cap 24, the lever D may be held more or less rigid, and that in connecting pipes with my device, no tools are necessary.

Having thus described my invention, I claim as new and desire to secure by Letters Patent,—

The combination with the pipe, provided with a conical outlet head, and an annular shoulder at the junction of the head with the pipe, of a fitting provided with a conical opening for receiving the head, a tubular operating lever having its lower portion bifurcated to straddle the fitting and pivoted thereto, a slotted collar engaging the annular shoulder, links connecting the collar with the operating lever, and a detent slidable in the tubular portion of the lever, said fitting being provided with a segmental lug for engagement by the detent, whereby to retain the operating lever in its adjusted position, said detent being grooved to permit it to straddle the lug.

In testimony whereof I have signed my name to this specification in the presence of two subscribing witnesses.

HERMAN E. LOEBE.

Witnesses:
GUSTAV A. MISTERFELD,
GUSTAVE E. ROESCH.